United States Patent [19]

Specktor

[11] Patent Number: 5,033,179
[45] Date of Patent: Jul. 23, 1991

[54] TOOL AND METHOD FOR ADJUSTING CAMBER AND CASTER

[75] Inventor: Gerald A. Specktor, St. Paul, Minn.

[73] Assignee: Shim-A-Line, Inc., Minneapolis, Minn.

[21] Appl. No.: 583,172

[22] Filed: Sep. 13, 1990

Related U.S. Application Data

[62] Division of Ser. No. 188,216, Apr. 29, 1988, Pat. No. 4,971,484.

[51] Int. Cl.$^5$ ............................................. B23B 35/00
[52] U.S. Cl. ................................... 29/402.01; 33/600; 408/1 R
[58] Field of Search ...................... 33/600; 408/1 R, 3, 408/115 R; 29/402.01, 402.03

[56] References Cited

U.S. PATENT DOCUMENTS

| | | |
|---|---|---|
| 1,601,645 | 9/1926 | Ratcliffe . |
| 2,232,374 | 2/1941 | Drews . |
| 2,424,485 | 7/1947 | Miller . |
| 2,889,633 | 6/1959 | Simon ................ 33/189 |
| 3,148,562 | 9/1964 | Moss . |
| 4,752,162 | 6/1988 | Groh ................ 408/115 R |
| 4,831,744 | 5/1989 | Specktor et al. ........ 33/600 |
| 4,971,484 | 11/1990 | Specktor ........... 408/115 R |

FOREIGN PATENT DOCUMENTS 11441 2/1910 France ............... 408/115 R

Primary Examiner—Daniel W. Howell
Attorney, Agent, or Firm—Kinney & Lange

[57] ABSTRACT

A tool for use in adjusting the camber and/or caster of a vehicle wheel attached to a suspension system of a vehicle having a strut member which is secured at an upper end of the vehicle at a first position includes a mechanism for selecting a second position to secure the strut member to the vehicle and includes a mechanism for selecting the second position including a guide for assisting in making an aperture at the second position.

3 Claims, 4 Drawing Sheets

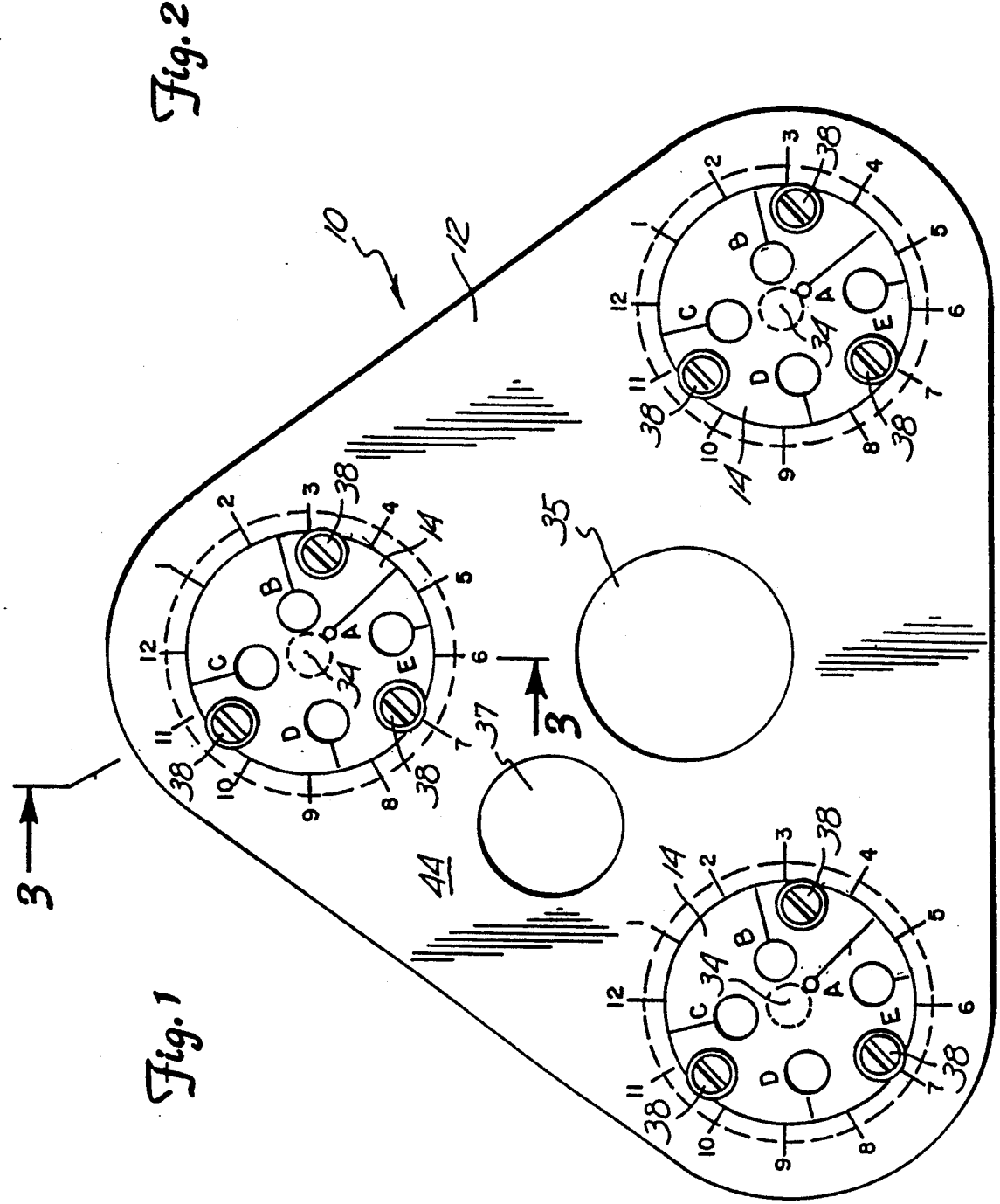

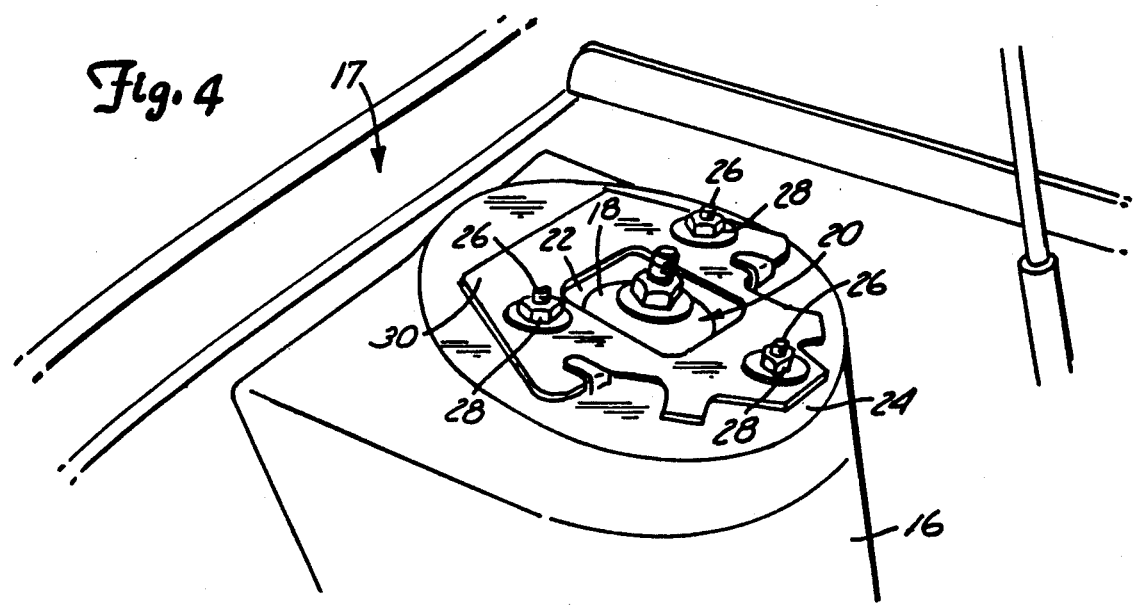
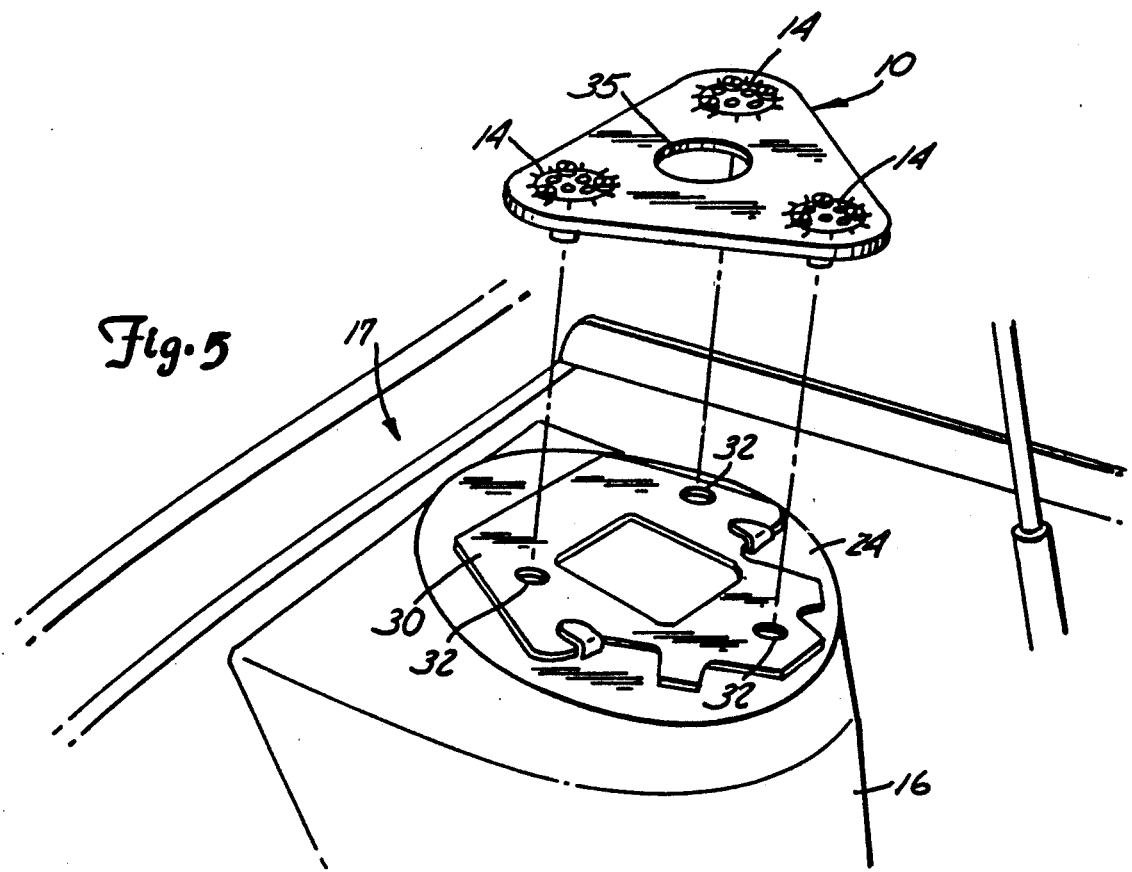

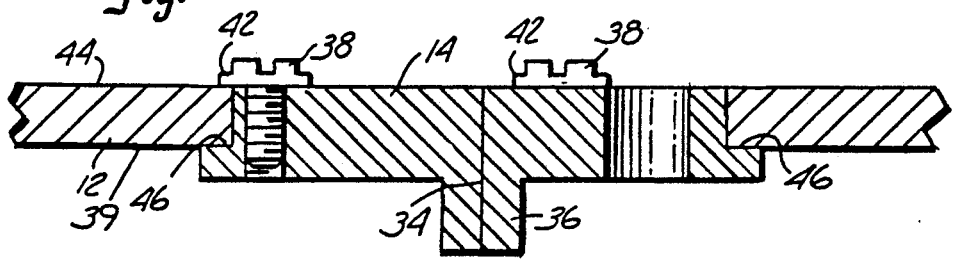

Fig. 7

TOOL AND METHOD FOR ADJUSTING CAMBER AND CASTER

This is a divisional of application Ser. No. 07/188,216, filed Apr. 29, 1988, now U.S. Pat. No. 4,971,484.

BACKGROUND OF THE INVENTION

1. Field of the Invention.

The present invention relates to devices that adjust the alignment of a vehicle wheel, and in particular, it relates to a tool and method to adjust camber and caster of a vehicle wheel in a vehicle having a strut-type suspension.

2. Description of the Prior Art.

The general trend in the automobile industry is to make automobiles lighter in weight. In doing so, conventional axles and suspensions are being eliminated and replaced with strut-type suspensions such as a McPherson strut suspension.

In a McPherson strut suspension, the shock absorber/spring assembly is attached to a plate that is welded to an upper portion of the vehicle wheel well. One method of adjusting the camber and caster of a wheel attached to a McPherson strut suspension is to detach the plate from the wheel well assembly and then move the plate in a direction to either adjust for caster, or for camber, or in a direction that adjusts both camber and caster. Readings of the wheel position are taken to determine if the correct camber and caster settings were reached. If not, the plate is moved again and measurements are taken. When the desired caster and/or camber settings are reached, the plate is then reattached to the wheel well. Such a process is both time consuming and has high labor costs.

SUMMARY OF THE INVENTION

The present invention includes a tool for use in adjusting the camber and/or caster of a vehicle wheel attached to a suspension system of a vehicle having a strut member which is secured at an upper end to the vehicle at a first position. The tool includes means for selecting a second position to secure the strut member to the vehicle and the means for selecting the second position includes guide means for assisting in making an aperture at the second position.

The first or initial position of the vehicle wheel is measured by using conventional methods. The second position is determined in part by use of a chart translating the change in camber and/or caster needed to place the vehicle wheel at a desired setting or position. The conversion chart translates the selected changes in camber and caster to indicia, which correspond to indicia on the means for selecting a second position such that the guide means is selectively placed to aid in forming an aperture at the second position.

BRIEF DESCRIPTION OF THE DRAWINGS

FIG. 1 is a top view of the tool of the present invention.

FIG. 1 is a side view of the tool of the present invention.

FIG. 3 is a plan view of the conversion chart of the present invention for a right wheel of a vehicle.

FIG. 4 is a perspective view of a strut tower with a strut secured thereto.

FIG. 5 is a perspective view of the strut tower and the tool of the present invention with the strut removed.

FIG. 6 is a sectional view taken along the line 6—6 of FIG. 1.

FIG. 7 is a plan view of a conversion chart of the present invention for a left wheel of a vehicle.

DETAILED DESCRIPTION OF THE PREFERRED EMBODIMENTS

The tool of the present invention is generally illustrated at 10 in FIGS. 1 and 2. The tool includes a flat plate member 12 with a plurality of rotatable disks 14 that are rotatably secured to the plate member 12. The disks 14 each include a plurality of guide holes, designated by the letters A, B, C, D, and E, which are selectively positioned on the disks 14. The tool 10 is used in association with a chart illustrated in FIG. 3. The chart is used to translate desired changes in camber and caster to indicia which correspond to indicia on the plate member 12 and on the disks 14. The tool 10 provides a quick and easy method of repositioning an upper end of a strut assembly to adjust camber and caster of a vehicle wheel.

The present invention is especially useful in adjusting camber and/or caster on automobiles manufactured by the Ford Motor Company under the trademark TAURUS and SABLE. However, the present invention can be used on other automobiles having suspension systems in which the strut member is secured at its upper end to the vehicle as the MacPherson strut.

A strut tower 16 of a vehicle 17 is illustrated in FIG. 4. The strut tower 16 houses an upper end of a coil spring/shock absorber assembly 20 of a McPherson strut suspension (not shown) which is conventional and well known. As illustrated in FIG. 4, a top end portion 18 of the spring/shock absorber assembly 20 extends through an aperture 22 of the strut tower 16. The coil spring/shock absorber assembly 20 is fixedly attached to an upper portion 24 of the strut tower 16 by bolts 26 of a top mount bracket assembly (not shown). The bolts 26 are threadably engaged by nuts 28 to retain the coil spring/shock absorber assembly 20 to the upper portion 24 of the strut tower 16. The bolts 26 extend through apertures 32 (illustrated in FIG. 5) in a plate member 30. The plate member 30 is fixedly attached, such as by welds (not shown), to the top end of the strut tower 24.

The tool 10 preferably includes three freely rotatable disks 14, each disk rotating about an axis 34, as illustrated in FIG. 1. The tool also includes a centrally located opening 35 which is used primarily to grasp the tool. The disks 14 are disposed spacially from each other such that the axes 34 are alignable with the centers of the apertures 32.

Each disk has a pin member 36 disposed about the axis 34 and extending downwardly from a bottom surface 39 of the tool member 10. The pin members are sized to fit into the apertures 32. The pin members 36 are inserted into the apertures 32 thereby aligning the tool and retaining the tool in position.

The plate member 12 also includes a second aperture 37 disposed half way between two adjacent disks 34. The aperture 37 helps position the tool 10 in a configuration where the strut tower 16 is attached by two bolts to a top mount bracket assembly in much the same manner as the three disk configuration of the tool as described previously herein.

In view of the above, it will be understood that although two and three disk arrangements have been discussed, the present invention also includes other configurations, such as a tool only having one disk 34.

Each of the disks 14 is held in rotatable contact with the plate member 12 by three cap screws 38 having annular shoulders 42. The cap screws 38 engage threaded apertures 40 located within the disks 14, as best illustrated in FIG. 6. The apertures 40 are positioned such that a portion of the annular shoulder 42 frictionally engages a top surface 44 of the plate member 12. In addition, each disk 14 has an annular shoulder 46 which slidably engages the surface 39 of the plate member 12. Tightening the cap screws 38 pulls the disk 14 against the plate member 12 increasing the frictional forces between the shoulders 46 and surface 39 to lock the disk in position and prevent the disk from angular (rotational) movement. Loosening the cap screws 48 permits rotation of the disk 14 about the axis 34 while still retaining the disk 14 in rotational relationship with the plate member 12.

Indicia are inscribed on the top surface 44 of the plate member 12 in a circumferential fashion about the disk 14. Numerals from 1 to 12 spaced in equal increments are used in the specific embodiment illustrated. However, it will be understood that other numerals and other increments can be chosen. Indicia are also inscribed on the disk to identify each guide hole. As mentioned previously, indicia used in the specific embodiment include the letters A, B, C, D, and E. Preferably, lines are also inscribed on each disk with each line projecting radially from each of the guide holes to the edge of the disk so that a selected guide hole may be aligned accurately with selected indicia on the plate member.

Figure 7:
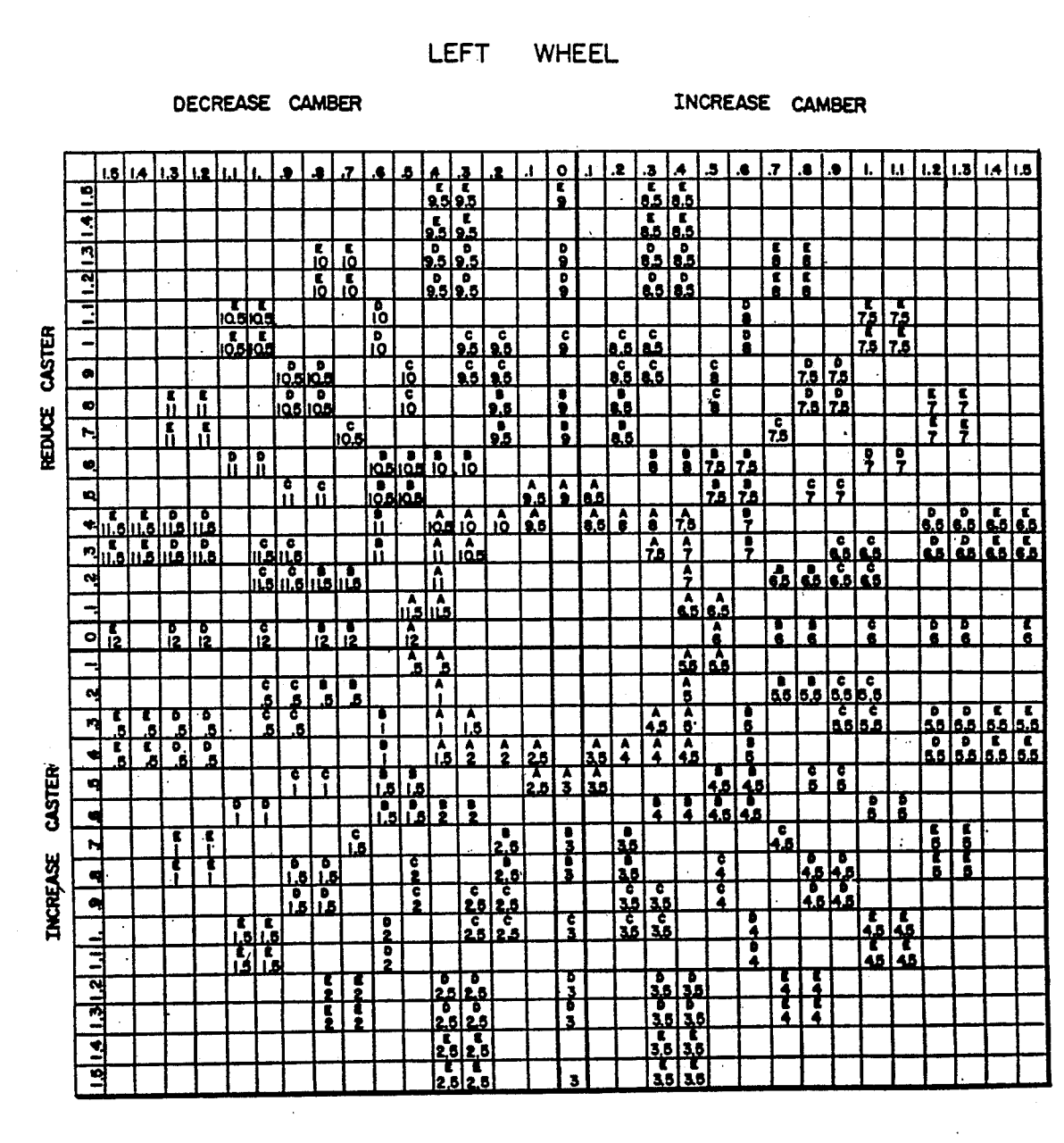

The proper guide hole to use and the angular position of the selected guide hole is determined through use of the chart illustrated in FIG. 3. The chart in FIG. 3 is used if the camber and caster of the right front wheel is adjusted. FIG. 7 includes a chart for use in adjusting camber and caster of the left wheel.

The guide holes in the disk, with the exception of guide hole A, are approximately of the same diameter as the original apertures 32, that is a diameter sufficient for the bolts 26 to extend through. The guide hole A is a pilot hole which will accommodate a drill bit of a smaller diameter than a drill bit used with the other guide holes. Since guide hole A is so close to the center of the disk 14 and the pin member 36, the hole A cannot be of a diameter the size of aperture 32. In using guide hole A, a pilot hole is drilled and then a drill of the size used with the other guide holes is used to drill the second aperture. The disks 14 are manufactured of hardened steel or any similar material which is capable of providing a drill guide that maintains consistant aperture sizes even after repeated usage.

Initially, measurements are taken of the camber and caster of the vehicle wheel in a conventional manner. The desired change in camber or caster or both is then conventionally calculated. The chart illustrated in FIG. 3 is used to translate the desired change in camber or caster to indicia that correspond to indicia identifying a particular guide hole on the disk 14 and to indicia the plate member. The indicia on the plate member are used to position the selected guide hole at the desired angular position. For example, if a 0.2° decrease in camber is desired with a 0.8 reduction in caster, the reductions in camber are located on the X and Y axis of the chart of FIG. 3. For each of the above values, the column (for camber) and the row (for caster) is followed until a common square is found. For the example being discussed, the common square has indicia "B" and "2.5". The indicia indicates that guide hole "B" is to be used and the disk rotated to align guide hole "B" half way between indicia "2" and "3" on the plate member.

Guide hole B is then aligned by rotating the disk 14 and positioning the scribed line half-way between the numerals "2" and "3" located on the plate member. All three disks 14 are positioned identically. After each disk is turned to the selected angular position, the cap screws 38 are tightened to retain the disks in the selected angular position.

To adjust camber and/or caster using the method and tool of the present invention, the nuts 28 are removed from engaging the bolts 26. The vehicle 17 is jacked up in a conventional manner resulting in the bolts dropping through the apertures 32.

Once the angular position of the disk is set, the pin members 36 are inserted into the holes 32 of the plate thereby positioning the tool. The selected guide hole is then used as a guide hole to guide a drill when drilling through the plate member 30 to provide a new hole for each of the shafts 26 to extend through.

Once all three holes are drilled, the tool is removed and the vehicle lowered such that the bolts 26 now extend through the newly drilled bolt holes. The nuts 28 are threaded on to the bolts and the strut is secured.

Although the present invention has been described with reference to preferred embodiments, workers skilled in the art will recognize that changes may be made in form and detail without departing from the spirit and scope of the invention.

What is claimed is:

1. A method for adjusting alignment of a vehicle wheel of a vehicle having a strut-type suspension with a strut member that is secured to the vehicle at one end by at least one member extending through a first aperture in the vehicle member, the method comprising:
   determining the degree of change in caster or camber or both caster and camber as needed to adjust alignment;
   positioning a tool including a guide hole that is selectively movable to a predetermined location, the location having been determined in reference to the first aperture;
   drilling a second aperture using the guide hole of the tool as a guide to drill the second aperture; and
   securing the one member of the strut member to the second aperture, thereby adjusting the alignment of the vehicle wheel.

2. The method of claim 1 and further including:
   providing a chart having indicia that correspond to indicia on the tool such that the determined degree of change in caster or camber is translated to indicia disposed on the tool and used for selectively moving the guide hole to the position for drilling the second aperture.

3. The method of claim 2 wherein the tool includes means for engaging the first aperture and the method further includes:
   detaching the one member from the vehicle;
   engaging the first aperture with the means thereby referencing the first aperture for drilling of the second aperture.

* * * * *